(12) United States Patent
Kalitventzeff et al.

(10) Patent No.: US 6,189,310 B1
(45) Date of Patent: Feb. 20, 2001

(54) COMBINED GAS TURBINE POWER SYSTEM USING CATALYTIC PARTIAL FUEL OXIDATION

(76) Inventors: Boris Kalitventzeff, Rue Montagne-du-Stimont 43, Ottgnies-Lovain-la-Neuve 1340; Jacques Ribesse, Rue J-F. Leemans 70, Brussels 1160, both of (BE)

( * ) Notice: Under 35 U.S.C. 154(b), the term of this patent shall be extended for 0 days.

(21) Appl. No.: 09/051,645
(22) PCT Filed: Oct. 21, 1996
(86) PCT No.: PCT/BE96/00112
  § 371 Date: Jun. 11, 1998
  § 102(e) Date: Jun. 11, 1998
(87) PCT Pub. No.: WO97/15786
  PCT Pub. Date: May 1, 1997

(30) Foreign Application Priority Data

Oct. 20, 1995 (BE) .................................................. 09500879

(51) Int. Cl.[7] ........................................................ F23R 3/40
(52) U.S. Cl. .............................................. 60/39.06; 60/723
(58) Field of Search .............................. 60/39.06, 39.12, 60/723

(56) References Cited

U.S. PATENT DOCUMENTS 5,248,251 * 9/1993 Dalla Betta ............................ 60/723

FOREIGN PATENT DOCUMENTS

2268694 * 1/1994 (GB) ........................................ 60/723

* cited by examiner

Primary Examiner—Louis J. Casaregola
(74) Attorney, Agent, or Firm—Meroni & Meroni, P.C.; Charles F. Meroni, Jr.

(57) ABSTRACT

A gas turbine power system for generating energy by means of a gas turbine cycle, wherein heat energy is more effectively used by burning the exhaust gases (109) and the partial oxidation of said exhaust gases (109) is achieved by means of a hypostoichiometric amount of air and steam fed into a catalytic reactor (107) to form a first oxidation stage followed downstream in said turbine (103) by additional oxidation occurring in a power turbine (104) or downstream therefrom, said power turbine being in turn arranged downstream from the catalytic reactor (107). Catalytic partial oxidation may be performed using a supply of an initiating agent, particularly hydrogen. The method is remarkable in that the hydrogen fed into the reactor inlet through an injector (113) is provided by recycling part of the effluent from the reactor, the power turbine or a reforming reactor for reforming part of the fuel gas with a large excess amount of steam for performing catalytic partial oxidation.

24 Claims, 7 Drawing Sheets

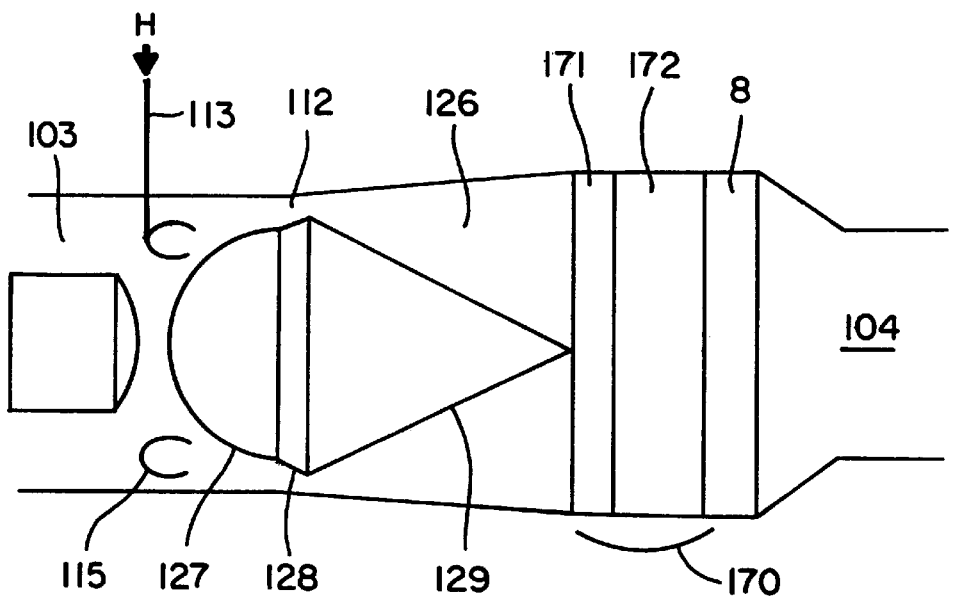
Fig. 4
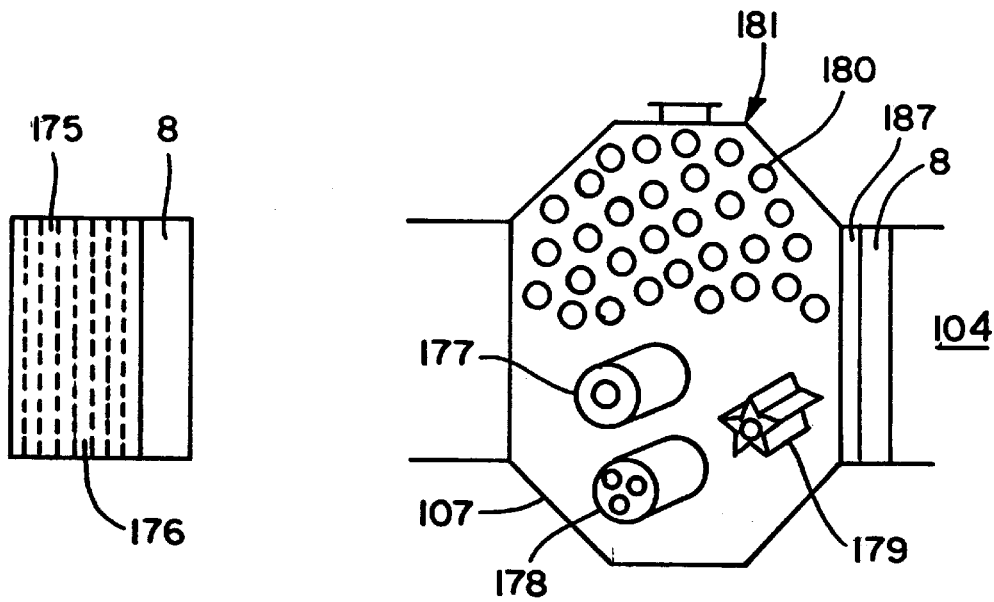
Fig. 5
Fig. 6

COMBINED GAS TURBINE POWER SYSTEM USING CATALYTIC PARTIAL FUEL OXIDATION

TECHNICAL FIELD

The present invention relates to a thermal energy system comprising at least one gas turbine intended to generate mechanical and/or electrical energy by operating a gas-turbine cycle in which exhaust gases of the cycle having a certain amount of energy capable of beneficiation, in particular mechanical and/or thermal beneficiation, are produced.

TECHNOLOGICAL BACKGROUND

The use of conventional gas turbines for the proposed industrial applications is well known. Thus, when a cycle comprising one or more gas turbines is placed upstream of an existing steam cycle of a power station, the overall energy efficiency of a conventional power station may go from 0.4 to 0.45 at the cost of extensive modification of the steam cycle, in particular by the addition of economizer exchangers. However, this technique proves to be expensive and only justifiable if the cost of the fuel itself is high. What is more, this technique involves an appreciable reduction in the useful power of the steam cycle. This results in only a modest overall gain in power, which for economic reasons is often unsatisfactory.

Another technique involves heat/force cycles, in which the gas turbine delivers mechanical energy and the exhaust gases deliver heat which can be exploited in various forms. In the case of a conventional gas turbine, this technique may prove to be useful when the necessary thermal energy is at low temperature, generally below 600° C. On the other hand, this technique is not applicable when the thermal requirement is at a higher temperature level, in some cases even markedly higher, as is the case for instance in cement works, glassworks and steelworks or in certain furnaces. These plants, upstream of which the gas-turbine cycle may be applied, are all provided with heat regenerators for reheating the combustion air, this heat no longer being able to be recovered after the modification.

The conventional gas-turbine cycle involved in heat/force combined systems comprises an air compressor, a combustion chamber with a large excess of air and a turbine which generates the mechanical power. Downstream of the turbine, only the heat from the exhaust gases can be recovered.

Yet another technique involves combined cycles consisting of gas turbines and steam turbines of specific design. Their efficiency is currently between 0.5 and 0.53.

Even though conventional combined systems are operational, problems of implementation remain.

In so-called partial-oxidation systems, combustion is certainly complete, but staged. Firstly, partial oxidation is carried out, using air in substoichiometric quantity and steam, in a catalytic reactor which replaces the combustion chamber of the conventional gas-turbine cycle. Next, the combustion is completed downstream in the power turbine before the thermal energy of the exhaust gases is used.

The principles of a partial-oxidation gas turbine have already been presented earlier, but the arrival of nuclear power stations and other factors, such as the possibility of supplying with natural gas, have not encouraged its development. Moreover, it would also seem from the prior art that the technological elements essential for improving the application of these principles were not forthcoming.

STATE OF THE ART

The publications mentioned below should be considered: "Cycle de turbine à gaz comportant un réacteur d'oxydation partielle catalytique de gaz naturel, son application dans les systèmes énergie-chaleur" by J. Ribesse at the 8th World Energy Conference in Bucharest from Jun. 28 to Jul. 2, 1971 and in Gas Wärme International, Vol. 20–7/6 July and August 1971; "Cycle combiné avec réacteur à oxydation partielle du combustible" by J. Ribesse, A. Jaumotte and A. De Goeyse, Entropy, 1976 and "The Isotherm Partial-Oxidation Gas Turbine" by J. Ribesse, December 1990, in the European Journal, Vol. 36, No.1, pages 27 to 32. It follows from these publications that the principle of partial oxidation consists in carrying out a catalysed exothermic reaction on the fuel, such as natural gas, with compressed air under substoichiometric conditions and a limited amount of steam, so as to reach a predetermined reaction-gas temperature selected for the gas-turbine cycle.

This results in a reaction gas composed of CO, $H_2$, $CO_2$, $H_2O$, $CH_4$, $N_2$ and fuel. The reactions involved are:

$CH_4 + 2O_2 + 8N_2 \rightarrow CO_2 + 2H_2O + 8N_2$ (exothermic)
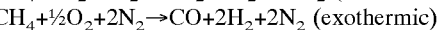
$CH_4 + \frac{1}{2}O_2 + 2N_2 \rightarrow CO + 2H_2 + 2N_2$ (exothermic)
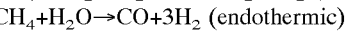
$CH_4 + H_2O \rightarrow CO + 3H_2$ (endothermic)

Belgian Patent No. 769,133 describes a machine using specific elements, namely two compression stages and a catalytic partial-oxidation reactor producing a combustible gas which is expanded in the power turbine with intermediate injection of water and steam. This exhaust gas can be consumed in a thermal application benefiting from its enthalpic content. The process used involves the use of machines of a specific construction, such as turbines and compressors, the specific elements of which are not, however, described.

Belgian Patent No. 1,003,760 describes a gas turbine system designed specifically for partial oxidation. For this purpose, it comprises a compressor adapted so as to have a higher pressure level, a catalytic reactor and a turbine providing isothermal expansion by the effect of gradual internal combustion by means of the air for cooling the turbine blades. This futuristic system will be able to be implemented only after the systems described in Belgian Application 09500879 and in the present patent application have been applied in more directly realizable assemblies.

In the aforementioned patent, the more specific means of the invention are not described either.

The systems briefly described in the aforementioned Patents BE-769,133 and BE-1,003,760 have a major drawback as they do not allow the available commercial gas turbines to be (re) converted. This consequently requires the use of machines which are not produced at the present time and which thus have to be specifically developed, thereby involving very considerable investments.

Belgian Patent No. 1,004,714 describes the structure of a partial-oxidation gas-turbine cycle. For this purpose, a catalytic oxidation reactor is provided. The reactor contains reforming catalyst, a booster-ejector and a system for ignition and for temperature maintenance at stoppage. Fitting it to existing turbines is presented in the case of the use of a pressure ranging from 50 to 60 bar and the use of the cooling air as oxidant in order to obtain expansion in the gas turbine at a constant temperature.

Moreover, the aforementioned Patent BE-1,004,714 deals briefly, and in a theoretical manner, with two of the three applications of partial oxidation which are described below, namely the conversion of conventional gas turbines and the constant-temperature expansion turbine, of specific design.

Thus, in general, problems of, for instance, implementing each of the aforementioned patents remain.

SUBJECT OF THE INVENTION

The object of the invention is to remedy the aforementioned drawbacks and to provide a solution appropriate to the problems resulting from the foregoing with regard to the state of the art.

The system according to the invention is intended to be applicable in all energy systems which comprise a cycle consisting of one or more gas turbines, whether this cycle is combined with a steam-turbine cycle or with thermal beneficiation of the effluent of the gas-turbine cycle.

Thus, the first subject of the present invention is the procedure for increasing the power of a thermal power station, which procedure is commonly called repowering. The present invention also relates to particular aspects of the use of this technology in the applications mentioned above, especially energy systems which involve a gas-turbine cycle combined with beneficiation of the thermal energy of the exhaust gases of this cycle. This beneficiation is achieved either by complementary generation of mechanical energy (cycles comprising one or more gas turbines and steam turbines) or by cogeneration, i.e. heat/force combined generation. These various systems are generally referred to as combined energy systems.

Moreover, the present invention also aims to provide complementary technological means for applying catalytic partial oxidation, these being applicable in all combined energy systems which comprise a cycle consisting of one or more gas turbines.

SUMMARY OF THE INVENTION

The invention consists of a combined energy system comprising at least one gas turbine intended to generate energy by operating a gas-turbine cycle. In the latter, exhaust gases are produced which have a certain amount of thermal energy associated with complementary energy conversion. The aforementioned gas turbine is a partial-oxidation gas turbine. The system comprises an air compressor, a catalytic partial-oxidation reactor carrying out the reaction:

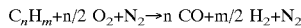

$$C_nH_m + n/2\ O_2 + N_2 \rightarrow n\ CO + m/2\ H_2 + N_2$$

with production of a combustible gas at a high and controlled temperature, and a drive turbine. The system is distinguished by the partial oxidation being carried out in the said catalytic reactor by means of air injected in substoichiometric quantity and of steam, so as to form a first oxidation step, which is subsequently completed downstream of the turbine by additional oxidation in a power turbine or downstream of the latter, the said power turbine itself being placed downstream of the said catalytic reactor. The system is also distinguished by conjoint beneficiation of the said thermal energy generated by combustion of the exhaust gases.

Thus, the system according to the invention firstly allows commercial gas turbines of the aeronautical type or, in general, industrial gas turbines operating in a combustion mode without excess air to be adapted so as, for a given machine, to improve the thermodynamic performance of the cycle and to increase the mechanical power available. It allows energy recovery in the secondary cycle of heat/force combined systems to be improved, the adapted turbine delivering a high-temperature combustible gas.

The invention is aimed at applications such as, on the one hand, increasing the power and performance of the energy cycles of conventional steam-cycle power stations and, on the other hand, heat/force cycles in which the thermal secondary cycle may be carried out at any temperature up to 1300° C., therefore allowing the use of cogeneration to be extended to many industrial thermal processes.

Secondly, the invention will allow future isothermal gas turbines to be constructed and operated.

The performance improvement results from better exploitation of the thermodynamic properties of the gas-turbine cycle by avoiding the energy loss in conventional cycles which is due to the use of a large excess of air. This is because it is possible to obtain the same temperature at the inlet of the expansion turbine using air in substoichiometric quantity, where the temperature is compatible with the blading constraints.

The reaction gas obtained by partial oxidation is an inflammable gas which has a lower specific weight than the combustion gas and which contains either no oxygen or practically no $NO_x$, in which $NO_x = aNO + bNO_2$; this type of reaction is widely known in the manufacture of synthesis gas.

By comparison with known gas turbine systems, and for the same drive turbine, the mechanical energy developed by the power turbine is higher in the case of the invention, and the energy absorbed by the compression of the air is reduced. The useful mechanical energy is therefore significantly increased in two respects, as much as being doubled.

In Table 1 below, A indicates the conventional case while B indicates the partial-oxidation case.

TABLE 1

|  | A | B |
|---|---|---|
| Volumetric ratio (gas + air)/air | 1.02 | 1.6 |
| Density of the gas | 0.98 | 0.7 |
| Power developed by the turbine | 1.0 | 1.15 |
| Power absorbed by compression | 0.65 | 0.45 |
| Useful mechanical energy | 0.35 | 0.70 |
| Composition of the gas | 14% $O_2$ | fuel |

Described below are the specific technological aspects of the invention for implementing the principle of catalytic partial oxidation of the fuel so that the reaction produces the desired temperature level, which cannot damage the blades of the gas turbines, without involving a very great excess of air which limits the performance of the thermal machines installed downstream.

Implementing partial oxidation makes it possible to improve the performance of the operational energy systems. By remedying the inadequacies of the above-mentioned prior art, the invention allows the industrial-scale implementation of partial oxidation to be made effective and operational in energy systems. This is the case with the repowering of existing steam-cycle thermal power stations. This is also the case with the adaptation of existing cogeneration-integrated gas-turbine cycles. Again it is the case for the isothermal-expansion turbines of the future. In fact, it may conceivably be possible to achieve an efficiency of approximately 0.6 as a result of significant progress, for instance, in the high-temperature withstand capability of materials.

The present invention applies the principle of partial oxidation, on the one hand, to existing systems involving aeroderivative and industrial turbines, and, on the other hand, to specific gas turbines to be designed. By virtue of the present invention, combined cycles with a very high efficiency, ranging up to 0.63, may be constructed. Thus, the invention consists of a system allowing effective and operational implementation of partial-oxidation turbines.

More particularly the invention makes it possible to adapt commercial aeronautical-type or industrial-type gas turbines, respectively, to operation in a combustion mode without excess air, so as to improve the thermodynamic performance of cycles for converting the energy in fuels into mechanical or electrical energy. In addition, the invention makes it possible to design, construct and operate future gas turbines, especially isothermal gas turbines. Thus, the invention provides additional innovative technological elements for implementing partial oxidation.

In addition, the present invention aims to solve two primary problems which confront flameless catalytic partial oxidation, namely of reaching a satisfactory initiation temperature and the possibility of carbon deposition.

In accordance with this invention, the presence of a suitable quantity of an initiator, advantageously hydrogen, in the process flux at the inlet of the partial-oxidation reactor helps to solve the above problems. In addition, it provides a complementary degree of flexibility in respect of the control and operability of the entire system. This hydrogen comes from an external source if it is economically available on the site or from the system itself. In this case, there are two alternatives: either partial recycling of the gases collected downstream of the reactor or an innovative combination of a partial-oxidation gas turbine and a small so-called "reforming" reactor which exchanges heat indirectly with the effluent from the power turbine.

The reactions involved in the partial oxidation of a gaseous fuel take place at different rates, these being characterized by different activation energies. It follows that the temperature profiles are difficult to control and therefore that thermal stresses are difficult to avoid in the catalytic masses, the period of use of which will be appreciably reduced. The catalysts are in this case rendered friable, just as they could be by deposition of carbon within the pores of the catalyst. This additional problem. Thus, by using successive layers of catalysts of different type and/or different activity, the temperature profiles are fully controlled and the risk of local runaway of the reactions is prevented.

In the partial-oxidation turbines of the future, in particular those of the "isothermal" type, there will be the additional problem of the combustion of the effluent of the partial-oxidation reactor inside the actual power turbine using air, in particular using at least the air for cooling this turbine. The aforementioned additional problem is solved by virtue of the invention by this complementary oxidation which may be carried out on an industrial scale by coating the blades of the gas turbine with a catalytic alloy. This may be carried out, in particular, by electrodeposition or by plasma.

When the partial oxidation of fuel is carried out in a gas-turbine cycle and including an air compressor, the latter is oversized. The excess compressed air can be expanded in a corresponding turbine with a significant part of the energy used for compressing it being recovered. The performance of the cycle can be markedly improved if this excess air is preheated before being expanded in the turbine. The heat will be supplied in an effective manner by indirect exchange with the flue gases from the combustion of part of the exhaust gases of the power turbine or by direct combustion of the combustible gas with the air to be preheated. According to the present invention, this heat can also be supplied from a hot source available on site.

Thus, the improvement in performance resulting from better exploitation of the thermodynamic properties of the gas turbine cycle is basically rendered technologically achievable by the presence of hydrogen at the inlet of a catalytic oxidation reactor and by the use of several different catalytic masses.

Furthermore, in an advantageous embodiment of the invention, the blades of the turbine downstream of the reactor are provided with a catalytic coating, where appropriate with the air being preheated—the preferred mode.

Other advantages and features of the present invention will be described below using exemplary embodiments illustrated by the appended drawings.

BRIEF DESCRIPTION OF THE DRAWINGS

FIG. 4 illustrates a view similar to FIG. 3, showing a variant of the booster-ejector.

FIGS. 5 and 6 each illustrate variants of the catalytic reactor with, respectively, noble-metal gauzes and a fixed bed consisting of catalyst granules.

DESCRIPTION OF THE INVENTION

The elements for implementing partial oxidation according to the present invention are described below for each of the respective applications given by way of preferred example.

Figure 1:
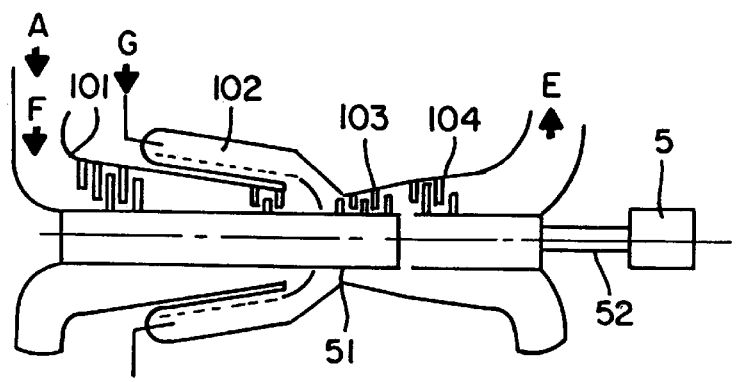
FIG. 1 illustrates a diagrammatic sectional view of a basic turbine.
Figure 7:
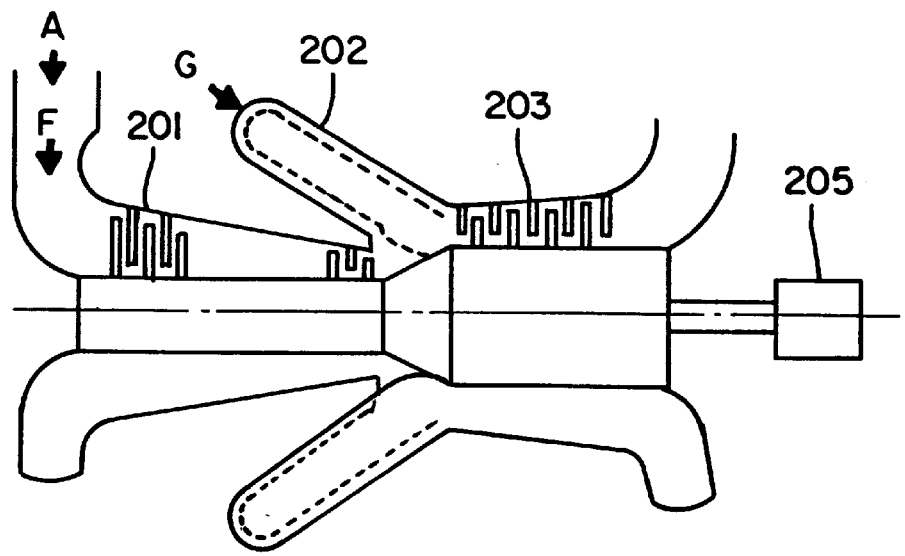
FIG. 7 illustrates a diagrammatic sectional view of a conventional industrial turbine.

FIGS. 1 and 7 show existing commercial gas turbines. FIG. 1 illustrates more particularly the case of an aeronautical turbine to which a power turbine has been added. FIG. 7 represents an industrial gas turbine.

FIGS. 2 to 6 are intended to demonstrate the characteristics of the invention in respect of the first application described below of adapting aeroderivative turbines to the partial-oxidation technology, both for the repowering of conventional thermal power stations and for heat/force cogeneration applications.

FIGS. 8 to 15 demonstrate the conversion of industrial turbines in order to incorporate the technology of partial oxidation, which conversion is intended to improve combined energy systems, thus forming the second application according to the invention described here.

Figure 16:
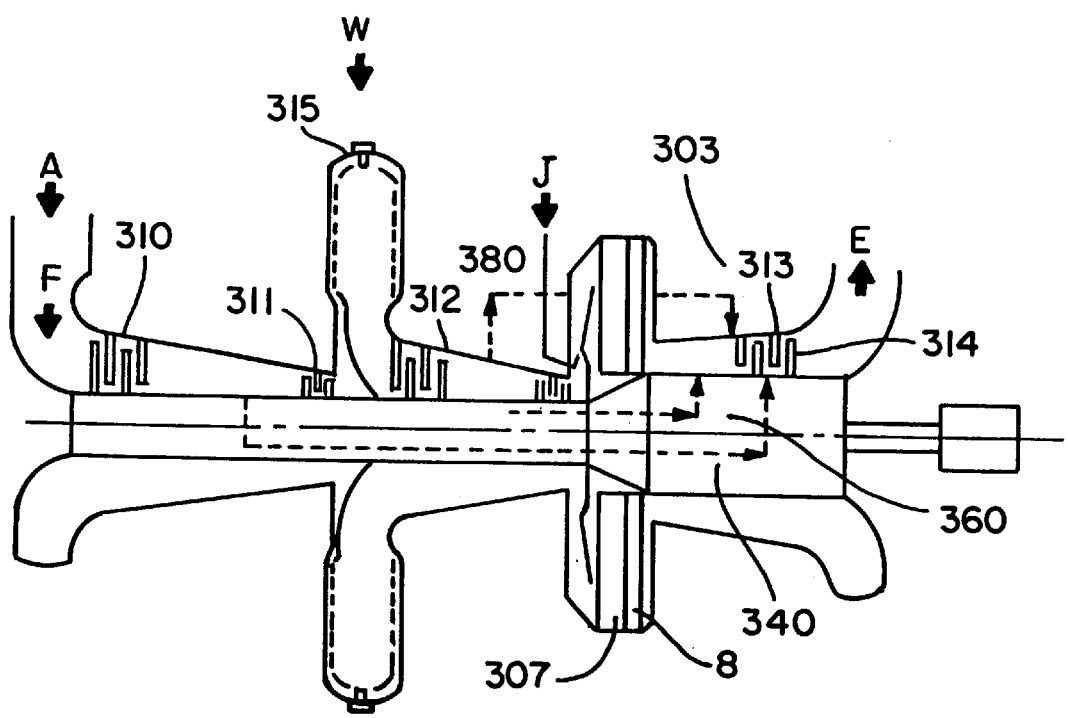
FIG. 16 illustrates a view similar to FIGS. 1 and 7 of a partial-oxidation turbine of a specific design in a third embodiment of the system according to the invention.
Figure 17:
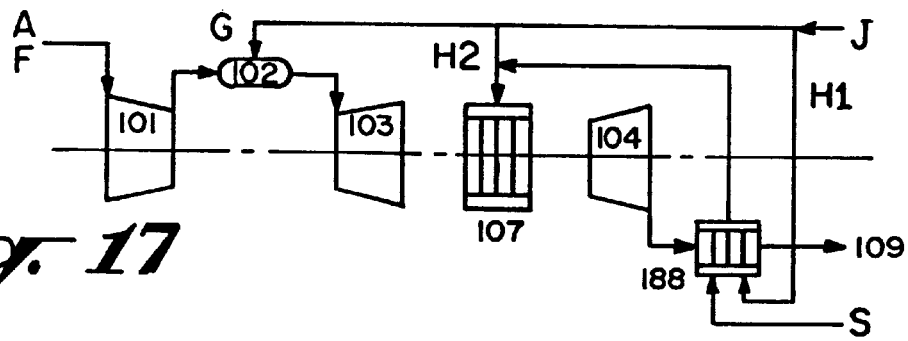
FIGS. 17 to 19 represent diagrammatic views showing the operation of the first embodiment of the system according to the invention, similar to FIGS. 1 and 2, in three successive initiator-injection modes.
Figure 18:
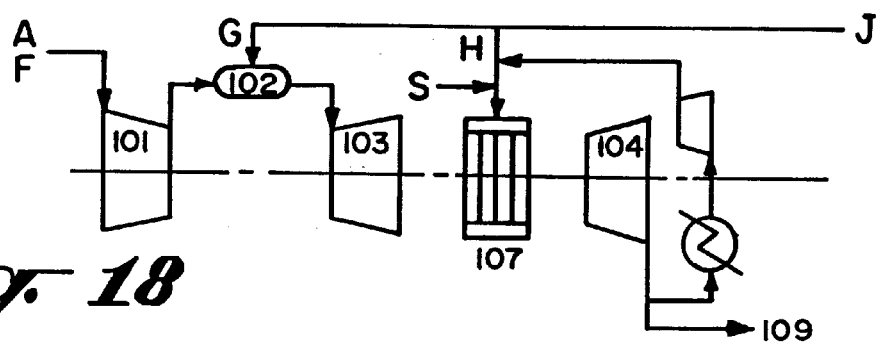
Figure 19:
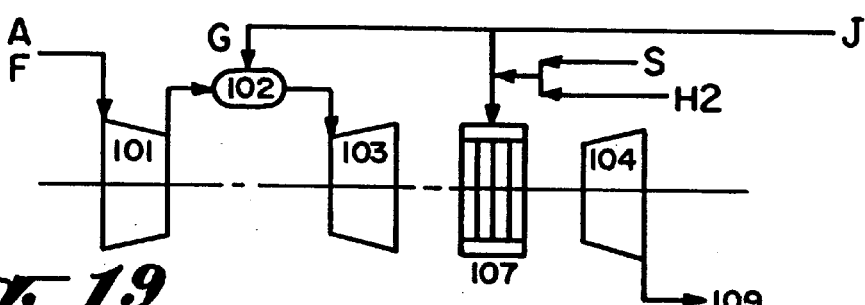
Figure 20:
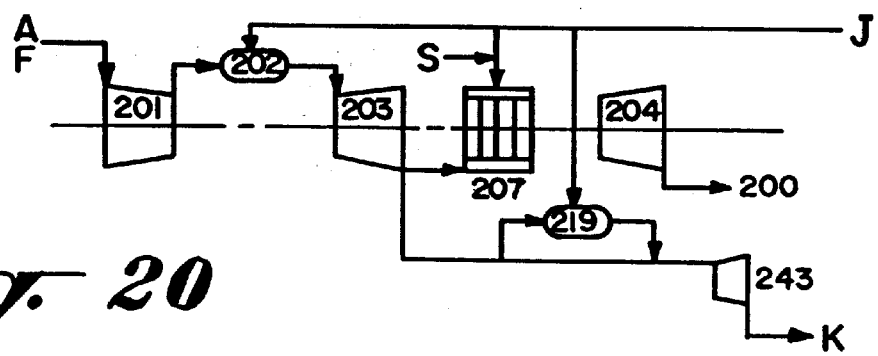
FIG. 20 represents a diagrammatic view of a variant of the second embodiment of the system according to FIG. 8.

FIG. 16 illustrates the incorporation of the technology according to the invention in gas turbines of a specific design, forming the third application described.

Figure 2:
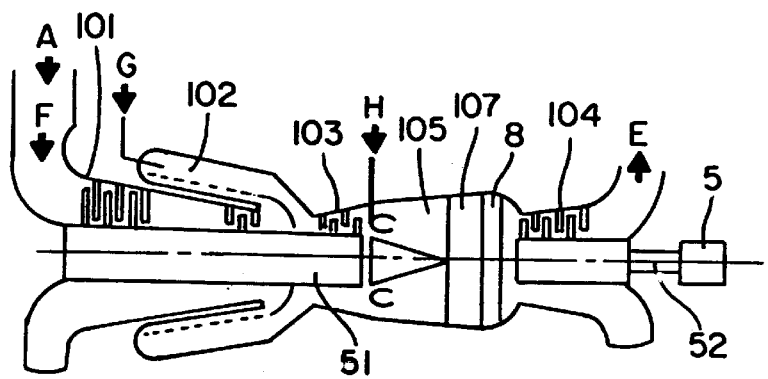
FIG. 2 represents a first embodiment of the system according to the invention with adaptation of an aeroderivative turbine.

FIGS. 1 and 2; 7 and 8, as well as 16, aim to demonstrate the characteristics of the invention. These show a one-stage compressor 101, as in FIGS. 1 and 2, or alternatively a two-stage compressor, as illustrated in FIG. 16, a combustion chamber 102 with a large excess of air, a drive turbine 103 and a power turbine 104, an alternator 5, a catalytic reactor composed of an inert layer 171 and an active layer 172, a filter 8 and exhausts 109 directed towards a steam cycle or towards another enthalpy beneficiation means. A system for ignition and for temperature maintenance at stoppage is also provided. The said reaction is preferably initiated without a flame and with a minimum flow rate of steam, thus avoiding carbon deposition.

The applications mentioned below have in common most of the technological elements, both structural elements and functional implementation elements, with, in some cases, specific aspects for the various applications of the present invention, in particular the catalyst 170, 270, 370, the partial-oxidation reactor 107, 207, 307 and the flexibility in terms of the oxidant at the inlet of the catalytic reactor 107, 207, 307. If the pressure in the latter is too low, a booster-ejector 106, 206, 306 is provided, this serving in all cases as a mixer, otherwise exploiting the higher pressure of the combustible gas, with control of the system on the basis of a mathematical model. Furthermore, a method of fitting the various elements according to the invention to existing units, so as to form a high-performance system, even when starting with existing units, is proposed. This thus allows recovery from these units under satisfactory conditions. As a result, there is the possibility of advantageously achieving considerable savings and of reducing the pollution from industrial or discharge sites.

The technological elements described below are to be considered within the scope of the present invention either by themselves or by their use within applications of implementation of partial oxidation in combined energy cycles or in heat/force cogeneration units.

The catalytic means used in the partial-oxidation reactor 107 advantageously consist of impregnated metals on porous supports 173 so as to provide the reactions of partial oxidation of the fuel with steam and air or gases expelled by a high-pressure gas turbine 103 into the aforementioned partial-oxidation reactor 107. Thus, the following may be used: nickel on activated alumina, $Ni/Al_2O_3$, preferably with a concentration of between 3 and 15%; platinum on zirconium oxide $Pt/ZrO_2$ forming a preferred composition with a concentration of between 0.1 and 1%, as it generates very little carbon deposit; $Pd/ZrO_2$ or $Pt-Rh/ZrO_2$. Alternatively, the said catalytic means may also consist of metal gauzes composed of the above metals, especially Pt, Pt-Rh and Pt-Zr.

Figure 3:
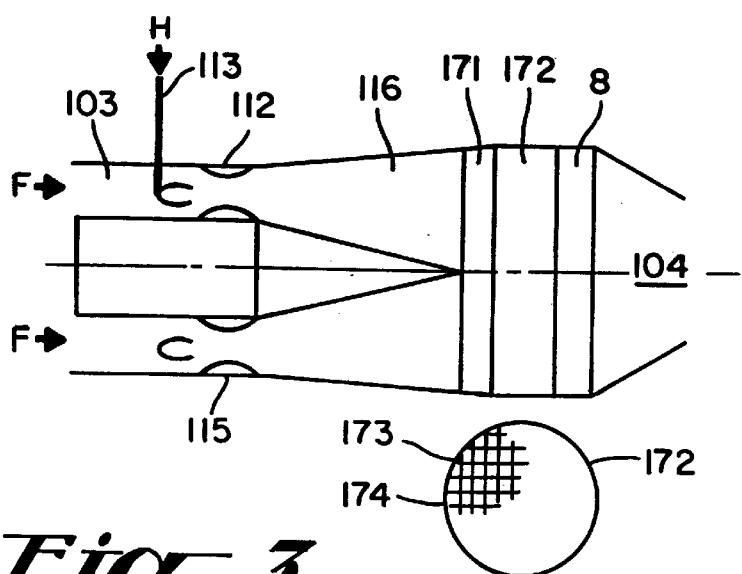
FIG. 3 represents an enlarged detail of FIG. 2, showing a preferred booster-ejector and a preferred reactor shape.

Moreover, the active porous support of the catalyst 172 and the inactive layer 171 are advantageously honeycomb one-piece components 173 with internal channels 174, as illustrated in FIG. 3, or are in the form of monotubular or multitubular granules with a smooth external surface 177, 178 or monotubular or multitubular granules with a fluted external surface 179, as in FIG. 6, the multitubular form being preferred. The partial-oxidation reaction catalyst support is applied to the gas turbines with stability and heat-shock-resistance properties in the temperature range going from 600 to 1000° C., not generating solid particles, and producing low pressure drops.

The catalyst support consists of alumina or of refractory metals, where appropriate in alloy form, such as nickel-chromium. In the case of active alumina, other metal oxides, such as oxides of magnesium or of silicon, may be added. For particular applications, the catalyst support may be in the form of hollow rings or of cylinders which are crenelated or pierced with holes.

The reactors 107, 207, 307 are adapted to the applications, in particular to aeronautical-type, industrial or specific-design gas turbines, respectively. Downstream of an aero-derivative turbine delivering the oxidant, the reactor is in the form of a horizontal cylinder, as illustrated in FIG. 2. The aforementioned reactor 107 is shown in FIG. 3 in the form of two successive layers 171, 172, only one of which, the downstream layer 172, comprises catalyst. The reactor may also be in the form of a vertical cylinder of the silo type or may contain a series of catalytic metal gauzes 176 perpendicular to the direction F of the stream of reaction gases, as illustrated in FIG. 5. The cylindrical metal casing 175 is lagged or protected thermally by a double-walled casing through which the inlet stream to be reheated flows.

The reactor described in document BE-1,004,714 can also be used within the context of the present invention, particularly when it is filled with a specific catalyst, as defined above. Furthermore, the devices 206 for making the reaction gases flow radially across the inactive layer 271 and the specific catalyst 272 also form part of the invention, as illustrated in FIGS. 8 to 12. Whenever it is crucial for the pressure drop across the catalytic bed 207; 271, 272 to be minimal, the latter devices 206 are preferred.

Figure 8:
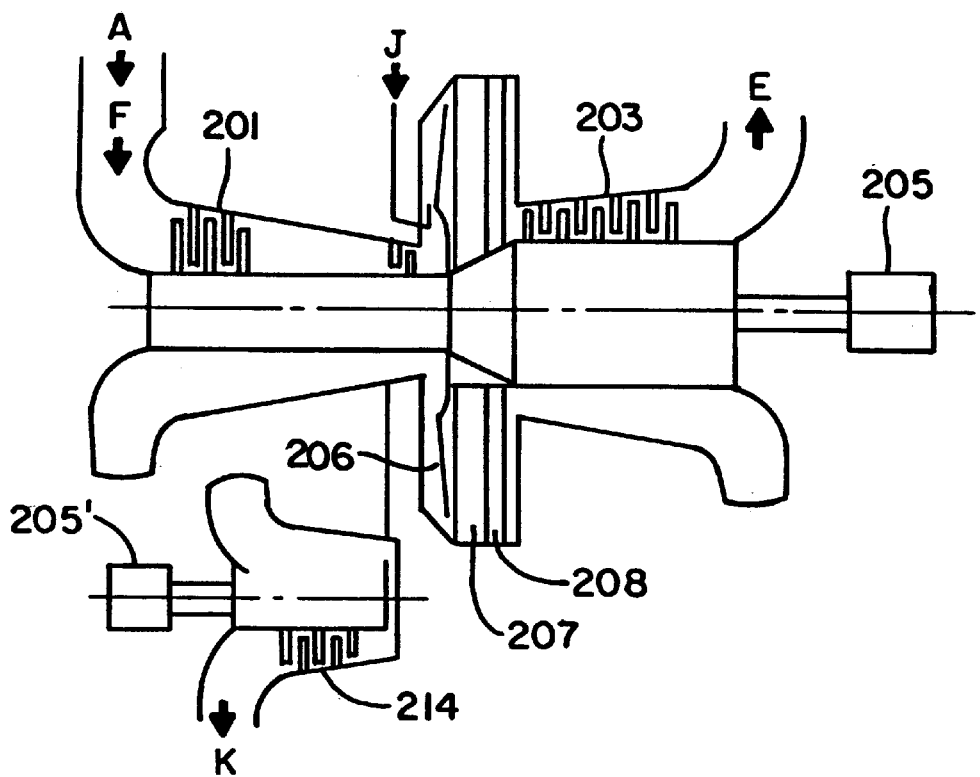
FIG. 8 illustrates a preferred way of adapting an industrial gas turbine according to a second embodiment of the system according to the invention.

The reactor 207 illustrated in FIG. 8 is filled with the specific catalyst described above. This form of the reactor 307 is also applied in the case of the specific machines illustrated in FIG. 16, which comprise in particular a compressor 310 having two stages 311, 312.

The axial horizontal cylindrical form, using a one-piece catalyst 172 with a honeycomb shape 173, is preferred in the case of repowering thermal power stations, as illustrated in FIGS. 2 and 3.

The silo forms, using metal gauzes 176 or granules of catalyst 180, are preferred in the case of adapting existing industrial gas-turbine cycles. These forms are not illustrated as the structures of the existing combustion chambers 202 which work with a large excess of air are used in this case and are adapted to flameless oxidation.

The axially symmetrical shapes of the mixer booster-ejector 106 are illustrated in FIG. 3. The booster-ejector 106 may be made from several nozzles housed in cylindrical casings fastened in a ring configuration with annular inlet and outlet manifolds.

The oxidant, injected into the partial-oxidation reactor 107, consists, in the case of the repowering of thermal power stations in FIG. 2, by the effluent of a turbojet. In the case of adapting an existing industrial gas turbine according to FIG. 8 or one to be manufactured according to FIG. 16 for partial oxidation, the oxidant advantageously consists of the effluent from the air compressor 201 or 310, respectively.

FIG. 3 shows a diagram of the system. A turbojet delivers the oxidant for the reactor by burning and A expanding gas with compressed air in large excess. The burners of the combustion chamber 102 are suitable for gas. The booster-ejector 106 with its defined shape exploits the pressure of the combustible gas fed at this point in order to increase the pressure of the mixture with respect to that of the oxidant. The partial-oxidation reactor 107 contains a catalyst and a support selected from those which were specified above. A filter 8 for retaining carbon or coke and catalyst dust is placed so as to be readily removable. A commercial power gas turbine 104, for completing the overall gas-turbine cycle particular to this application, drives an alternator 5 or a mechanical machine and delivers a combustible gas to the exhaust 109. The enthalpy of the latter will be subsequently utilized in the thermal power station, the boiler of which will not have to undergo expensive modifications because of the temperatures achievable by combustion of the exhaust gases 109 of the power turbine 104.

The description below is more detailed and is intended to demonstrate the characteristics of the invention with regard to FIG. 1.

A turbojet engine is composed of an air compressor 101, a battery of combustion chambers 102, in which chamber or chambers the fuel is burnt with a large excess of air from the compressor 101, so as to achieve a temperature compatible with the system, and a high-pressure drive turbine 103 delivering the mechanical energy absorbed by the compressor 101, these two machines being fastened to the same common shaft 51.

The hot gases ejected by the high-pressure turbine 103, for example at 650° C., are available at a residual pressure of between 3 and 5 bar.

In existing conventional systems, as illustrated in FIG. 1, the reaction gases are then expanded in the power turbine 104 and escape therefrom at a low pressure and at a temperature of between 400 and 500° C. This power turbine 104 drives a mechanical or electrical machine 5. The working power represents only approximately one third of the total power delivered by the overall expansion of the gases, the remaining two thirds being intended to drive the compressor 101. The exhaust gases 109 contain between 13 and 16% oxygen, on account of the large excess of air used in the combustion, as well as a large quantity of toxic gases such as NOx. The specific power of a conventional gas turbine is quite limited. This specific power is represented by the ratio of the available useful mechanical energy to the amount of gas conveyed in the cycle.

The present invention enables the performance of known systems to be substantially improved by considerably increasing the specific power, which is generally doubled, and by drastically limiting NOx emissions, which are reduced almost to zero on leaving the reactor. It also makes it possible to obtain unequalled performance within the context of increasing the power of steam-type thermal power stations without having to adapt or convert the thermal cycle of the units in question.

Referring now to FIGS. 2 and 3, the invention suitable for the turbosets described comprises the use of a number of booster-ejectors 106 of specific shape which are supplied with high-pressure fuel, such as natural gas, for example, at between 30 and 50 bar, and with high-pressure steam. These static devices suck in the gases containing oxygen in excess from the high-pressure turbine 103. They ensure uniform mixing of the oxidizing gas of the fuel with the steam so as, subsequently, to carry out an exothermic partial-oxidation reaction. They make it possible to recover the compression energy of the latter two fluids by increasing the pressure of the mixture, relative to that of the oxidant. One particular form of the booster-ejector 116, 126 according to the invention is shown in FIGS. 3 and 4.

It comprises a pipe 113, taking the fuel and the high-pressure steam into a circular internal duct. The latter distributes the fluids in an injector having a toroidal shell 115, in the form of truncated sectors, widening out gradually and having a reduced section 119, at which the speed of the fluid is close to the speed of sound. The section 119 then gradually increases downstream. By virtue of this device, the efficiency of recovery of the potential energy of the high-pressure fluids is optimized.

The booster-ejector 126 may also be constructed as in FIG. 4 by means of a central element 127 which is hemispherical in shape and extended by a throat 128 formed by a slightly divergent cone extended by an inverted cone 129, the external part being formed by a divergent truncated cone.

The invention also encompasses any other shape of booster-ejector exploiting the kinetic energy of the gases in the context of repowering thermal power stations.

The gases in the mixture, which are ejected from the booster-ejectors 106 at high speed, then advantageously pass through a catalytic bed 107 consisting of a block of specific catalyst 173 in the form of a honeycomb. The specific catalyst produces neither dust nor free carbon, its particular shape ensuring flow with a low pressure drop. It is intended to stabilize the fuel partial-oxidation reactions, which reactions produce a combustible gas at a controlled temperature of between 700 and 1000° C., for example 900° C. A quantity of steam is injected for the purpose of preventing soot from being formed.

One particular form of catalytic mass is shown by the references 171 and 172 in FIG. 3. The proposed catalyst 170 according to the invention is formed by the juxtaposition of elements composed of channels 174 with a square section, having dimensions of between 1 and 5 mm, with the length of an element between 100 and 300 mm. These elements consist of a thin-walled rigid support, which are resistant to thermal shocks and impregnated with a catalyst composed as described above. The supports for the catalysts have a high specific surface area. They are based on activated alumina in the case of Ni, in particular between 3 and 15% by weight, and based on zirconium oxide in the case of platinum, in particular between 0.1 and 1% by weight. The said non-active mixed part 171 of the catalytic reactor consists of the non-impregnated aforementioned support the said part 171 serving to distribute the reaction gases uniformly and to prevent the exothermic reaction from starting inside the booster-ejector 106.

According to the invention, other forms of catalytic reactors and other catalytic masses are also provided, as indicated below by way of preferred examples.

The catalytic element illustrated in FIG. 5 is composed of a number of gauzes 176 made of platinum, rhodiated platinum, Pt-Zr alloy, or palladium (these being described below).

FIG. 6 illustrates a reactor 181 in the form of an enlarged cylinder filled with granules 180 of partial-oxidation catalyst. The granules 180 have a cylindrical shape 177, a hollow cylindrical shape 178 or a fluted shape 179.

The preferred catalyst is formed with a support 175 made of refractory or metallic material, with nickel as the active material, on activated alumina, or with platinum or palladium as the active material, on zirconium oxide.

The invention also encompasses any other embodiment of an associable form of catalytic reactor in the case of repowering a thermal power station.

On leaving the catalytic reactor 107, the gas passes through a high-temperature filter 8, intended to collect the particles which could be accidentally entrained, and/or a thin layer 187 of support which has no active material and is intended to collect the entrained active elements.

Next, the gas flows into the power turbine 104 which drives a generator or a mechanical machine.

The power turbine is a well-known machine. Within the context of the invention, provision is made to operate the machine at a moderate temperature so as, in a preferred method of implementing the invention, to dispense with the systems for cooling the turbine blades. However, under certain conditions it will be necessary to provide cooling circuits and, in this case, to inject steam instead of air into them.

At the outlet 109 of the power turbine 104, the gas expelled at low pressure and at a temperature ranging from 550 to 600° C., in the direction indicated by an arrow E, is a combustible gas which can supply a conventional thermal unit such as a boiler of a conventional steam-type thermal power station or an industrial thermal equipment item, or else any type of industrial boiler or furnace operating at any temperature, as in a cement works, a glassworks or a steelworks.

TABLE 2

| Type of gas turbine | | Conventional | Invention without turbine conversion | Industrial turbine converted according to the invention |
|---|---|---|---|---|
| Thermal unit power | MWe | 210 | 250 | 240 |
| Gas turbine power | MWe | 2 × 25 * | 57 ** | 130 |
| Total power without degradation | MWe | 260 | 307 | 370 |
| Fuel consumption | MWth | 577 | 697 | 787 |
| Net power increase | MWe | 10 | 57 | 120 |
| Conversion efficiency | | 0.44 | 0.44 | 0.47 |
| NOX | mg/m$^3$ | 100 | 10 | 5 to 10 |
| Cost of converting the thermal cycle | | high | low | moderate |

* Use of two gas turbines
** A single gas turbine of the same type to be adpated Table 2 gives, by way of indication, the performance characteristics of an aeroderivative gas turbine, adapted according to the invention to partial oxidation and applied to the repowering of a steam-type thermal power station having a net power of 250 MWe.

The thermal systems, which generally comprise heat regenerators, must not be modified. This advantageously results in the adaptation costs being therefore very limited. In addition, the operation is reversible at any moment, thus making it possible to return to the prior situation.

The process according to the invention has a particularly beneficial technical and economic advantage, especially for the example illustrated by the numbers in the table. It is apparent that the specific power of the turbine is more than doubled, as indicated previously. Furthermore, a significant gain, namely more than 22%, in power of the power station is obtained. This value should be seen in relation to that for the conventional gas turbine, which is only 10%. In addition, a very low conversion cost is also obtained and the production of NOx is virtually eliminated.

The gas turbine of aeroderivative origin, in the case of the invention, requires no conversion.

The second application relates to the conversion of conventional industrial gas turbines.

Figures 10, 11, 12:
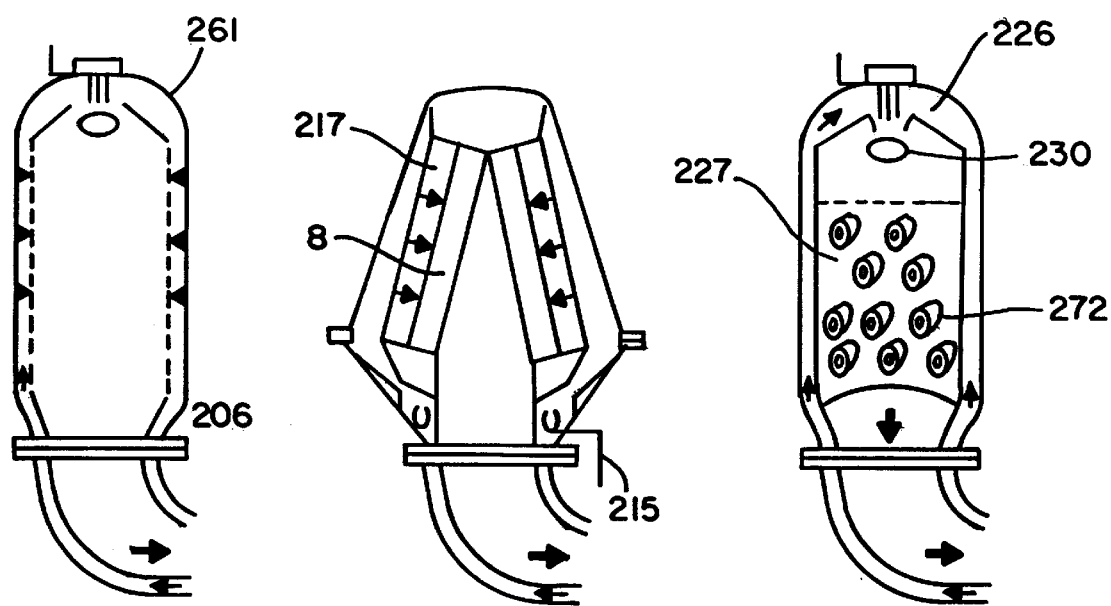
FIGS. 10 to 12 illustrate the mode of conversion of the silo-type combustor, with two conversion variants.

It is possible to convert any conventional gas turbine to partial oxidation according to the invention in the context of the mentioned industrial applications relating to turbojets. However, this adaptation requires modifications to be made to the original gas turbine, as illustrated in FIGS. 10 to 12.

The industrial gas turbine consists of an assembly comprising an air compressor 201, one or more combustion chambers 202, as illustrated in FIG. 7, in each of which the fuel is burnt with a large excess of air, and an expansion turbine 203 delivering the mechanical energy absorbed by the air compressor 201 and by a receiving machine 205, such as an alternator.

Implementation of partial oxidation according to the invention involves three major modifications and performance improvements described below.

The first modification consists in replacing the combustion chambers 202, which equip the gas turbine, by a partial-oxidation reactor 207, as illustrated in FIG. 8. This reactor 207 comprises one or more booster-ejectors 206 supplied with high-pressure fuel, such as natural gas for example, and with steam. The catalytic reactor 207 is provided with a peripheral form and contains a specific catalyst in the form of a honey-comb, in order to ensure that it is sufficiently rigid and has a low pressure drop.

Figure 9:
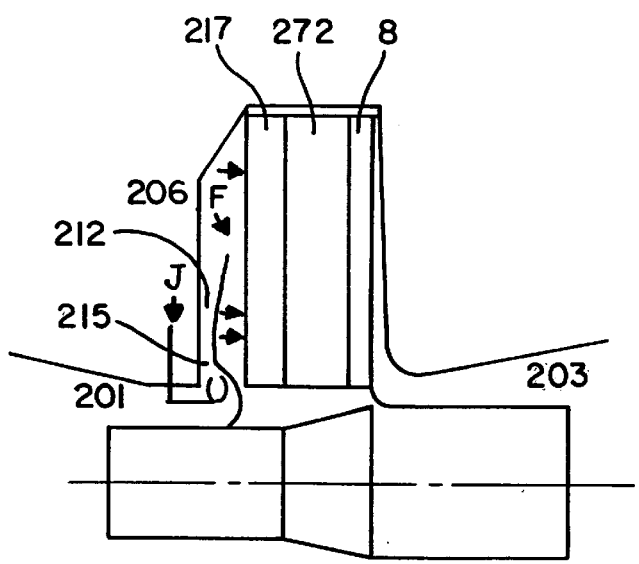
FIG. 9 illustrates an enlarged detail of a preferred embodiment of the reactor of the system according to FIG. 8.

According to one particular embodiment of the invention, the aforementioned booster-ejector 206 provided in the reactor 207 is radial, as shown in FIGS. 8 and 9, and consists of an injector having a toroidal shell 215 supplied with pressurized steam and fuel. The booster-ejector 206 comprises a throat 212 ensuring a flow speed close to the speed of sound. The section of the booster-ejector 206 increases in the direction of flow F so as to recover the compression energy.

Another form of booster-ejector comprises a battery of radially oriented elements.

The catalytic reactor 207 consists of an assembly of catalytic elements in the form of a honeycomb, the elements of which consist of rectangular channels having a dimension of, for example, 1 to 5 mm each side. The catalytic reactor 207 is therefore produced in the form of a ring surrounding the gas turbine.

The catalytic elements are divided into two parts 271 and 272, as illustrated in FIG. 9. The elements 272 are impregnated with a catalytic mass consisting of activated alumina and of nickel, preferably between 5 and 15%, or with other active materials mentioned above.

On the other hand, the elements 271 are not impregnated with a catalytic mass. They are intended to distribute the gas mixture uniformly over the catalytic surface and also to prevent the exothermic reactions starting in the booster-ejector 206.

Other forms of partial-oxidation reactor may be used, also depending on the original shape of the combustion chambers 202.

Example 1: a form of silo 212, as illustrated in FIGS. 11 and 12, replacing, according to the invention, that illustrated in FIG. 10. In this case, it is preferred to use a reactor 217 in the form of two reversed cones, containing catalyst in the form of a honeycomb held in place by meshes, as illustrated in FIG. 11. These reactors 217 also contain a peripheral booster-ejector 206, in FIG. 9, and a toroidal injector 215 supplied with pressurized gas.

Another form of vertical reactor 227 is shown in FIG. 12 and comprises a peripheral compressed-air supply, a mixer-ejector 226 and a layer of partial-oxidation catalyst 272 as used in chemistry for secondary reforming. In this case, a flame 230 is produced at the outlet of the ejector 226.

Figure 13:
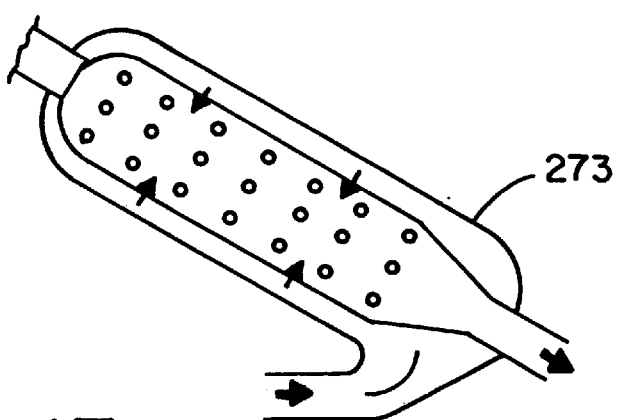
FIGS. 13 to 15 illustrate conversion modes of existing peripheral combustors and, respectively, two conversion variants.
Figure 14:
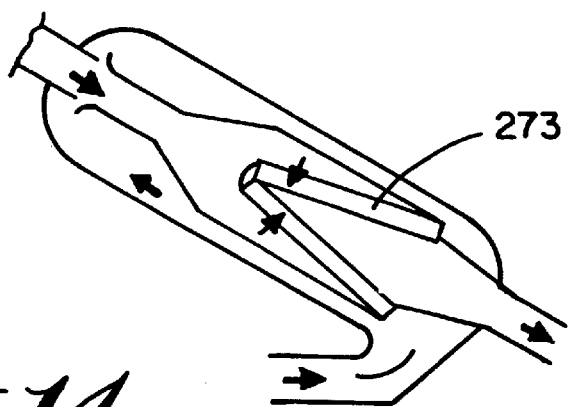
Figure 15:
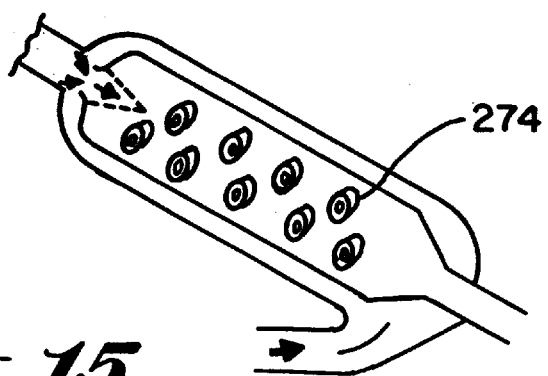

Example 2: a battery of cylindrical combustors placed obliquely all around the gas turbine illustrated in FIG. 13. The combustors are replaced by catalytic partial-oxidation reactors 237 as shown in FIGS. 13–15 and they include a peripheral compressed-air supply. The booster-ejector devices supply non-inflamed mixture to the catalytic masses 273, in the form of a honeycomb, as in FIG. 14, or according to the loose reforming catalyst 274, as illustrated in FIG. 15.

After leaving the catalyst 272, the gases pass through a high-temperature filter 8 or 208 intended to collect accidentally emitted particles.

The precise dimensions of the reactor 207 according to FIG. 8 are determined by the characteristics of the gas turbine which is to be converted to partial oxidation.

The reaction gas produced at the defined temperature passes through the expansion turbine 203, generating mechanical energy in greatly increased quantity compared to the initial situation.

The air compressor of a conventional gas turbine outputs too high a mass of air to ensure operation in partial-oxidation mode. Thus, in the second modification provided, the invention comprises the use of a complementary expansion turbine 214, as illustrated in FIG. 8, which bleeds off the air produced in excess by the compressor 201 and which thus recovers the excess mechanical energy consumed by the compressor. The expanded air can be used as the oxidant for a thermal application.

The gas-turbine blades are generally cooled by means of air from the air compressor 201 flowing through the blades. Thus, with the third modification to be provided in the case of application of the invention, the cooling air is replaced by steam in a lesser quantity. This allows savings to be made on this cooling air and prevents the internal combustion caused by the combustible gas in the turbine, this combustion not being designed for the conventional machines.

Furthermore, the power released by the turbine is significantly increased given the increased volume of gas, the gas having a markedly, approximately 20%, lower density, and the base parameters, especially the pressures and temperatures, remain more or less the same. Moreover, it will be necessary to increase the power of the mechanical receiver or of the alternator in order to absorb the additional power.

All these conversions according to the invention on an existing industrial turbine lead to a total net power which is more than doubled, taking into account the power recovered from the air-expansion turbine and the increase in the power of the turbine.

Table 2 gives the performance characteristics of a conventional industrial gas turbine adapted according to the invention to the repowering of a steam-type thermal power station having a power of 240 MWe.

The method of converting industrial gas turbines according to the invention is quite advantageous in the case of adaptation in steam-type thermal power stations operating in energy/heat cycle mode, with a power gain ranging from 40 to 50%.

However, this adaptation requires conversions to be carried out on the original gas turbine.

Likewise, the teachings of Table 3 confirm that the specific power of the turbine is considerably increased, even more than doubled, thereby markedly reducing the manufacturing cost. The total quantity of air to be compressed is close to the stoichiometric ratio instead of three times the ratio in the case of known advanced turbines.

Table 3 gives the performance characteristics of such a turbine operating in gas/steam combined-cycle mode and in gas/air/steam triple-cycle mode.

TABLE 3

|  | Gas/steam | Gas/air/steam |
|---|---|---|
| Turbine inlet temperature (° C.) | 1250 | 1250 |
| Compression ratio | 45 | 45 |
| Turbine outlet temperature | 1050 | 1050 |
| Temperature for secondary cycle | 1050 | 1050 |
| Temperature for tertiary cycle | — | 525 |
| P/T steam cycle: |  |  |
| pressure | 120/40/6 | 40 |
| temperature | 560/560 | 450 |
| Pressure, air cycle | — | 40/6.8 |
| Temperature, air cycle | — | 950 |
| Fuel, in MWth | 100 | 100 |
| Gas turbine net power | 40 | 40 |
| Air cycle net power | — | 15.6 |
| Steam cycle net power | 21 | 9.4 |
| Total net power, in MW cl | 61 | 65 |
| Net conversion efficiency | 0.65 | 0.65 |

The third application relates to the partial-oxidation gas turbine of specific design according to FIG. 16.

A specific gas turbine according to the invention is composed of an air compressor 310 with one or two stages, 311, 312, having, in the case of two stages, intermediate cooling by injection of reaction water 315.

A catalytic partial-oxidation reactor 307 of specific design, already described in the second application above, is provided. In the reactor 307, high-pressure air reacts by partial oxidation with the fuel and steam which are injected at high pressure. The reaction gas coming from the high-pressure reactor 307 and at a controlled temperature is expanded in the turbine 303. The gas from the reactor 307 is a fuel and its CO and $H_2$ concentration is high.

When the turbine 303 is operated at a temperature greater than 1000° C., it is necessary to cool the stator blades 313 and the rotor blades 314. According to the invention, this cooling is achieved in a conventional manner by internally injecting air into the blades so as thus to ensure that the blades are at a moderate temperature. This cooling air expelled in the turbine 303 reacts with the gas from the reactor 307 and participates in the gradual combustion thereof.

The expansion of the gas therefore proceeds isothermally, depending on the chosen operating parameters of the turbine 303, especially the temperature, pressure and quantity of steam added to the reaction. The gas expelled by the turbine 303 is completely burnt and is available at a very high temperature. This subsequently facilitates the beneficiation of its energy potential.

The optimum choice of these parameters steers the system towards high pressures, of between 40 and 60 bar.

The cooling air comes from the air compressor 310 and is taken, at the required pressure, via internal ducts 340, 360 to the rotor blades 314 and via external ducts 380 to the stator blades 313.

The present invention greatly improves the known performance characteristics of the most advanced gas turbines, namely an efficiency of direct conversion into mechanical energy ranging from 0.40 to 0.45, instead of the known 0.35–0.38 range, and a combined-cycle conversion efficiency ranging from 0.62 to 0.65, instead of the known 0.50–0.55 range. Furthermore, it is apparent from Table 3 that the operating conditions, especially the turbine inlet temperature, are markedly less drastic from a technological standpoint.

The systems in which the partial oxidation of the combustible gas is incorporated are complex, and even more complex to manage than the combined systems which are in operation. They are characterized by a narrow range of permissible temperatures at the entry to the catalytic bed and in the latter, notwithstanding the variations in load, in terms of mechanical power and in terms of heat, both from the quantity standpoint and from the thermal-level standpoint. The Belsim software and methodology (validation, parametric identification, simulation, optimization and optimum operation) are applied and all this computer technology will be adapted in the context of the invention to partial oxidation.

FIGS. 17 to 20 now illustrate diagrammatically an entire assembly of means for implementing the present system, the basic elements of which are derived from the experimental steps in the implementation of the partial-oxidation technology applied to gas-turbine cycles, i.e. in the implementation of the invention as described above.

Initiation of the catalytic reactions constitutes, in itself, a capricious step. This is because it depends on the catalyst at the top of the catalytic bed and on the composition of the reaction gases. In addition, once the initiation front has been created, it does not necessarily become stable, as it can migrate longitudinally. Under certain operating conditions and in transient states, carbon deposits have been observed, these reaching a level so as to create unacceptable pressure drops. For some catalysts, the phenomenon occurs over the entire length of the catalytic bed. Before industry got round to using hydrogen, the quantities of steam necessary for preventing carbon deposition was too great to ensure the best performance of the entire system. This is because, although it is well known that injecting steam into a gas turbine increases its power, as, for example, in vertical take-off aircraft, this additional power is only acquired at the expense of a low calorific value yield for the fuel. Although it is accompanied by an increase in the number of moles, the reforming reaction between the gaseous fuel and the steam is endothermic. Consequently, the molar ratio of oxygen to carbon must increase in order to deliver the advantage of additional heat and this partially prevents the increase in the number of moles due to partial oxidation.

The molar ratios defined by the expressions $$R_1=O_2/C, R_2=H_2O/C \text{ and } R_3=H_2/C$$

are typically, within the context of the invention, limited to $0.55<R_1<0.75$, $0.8<R_2<1.4$ and $0.03<R_3<0.15$, respectively.

The ratio $R_1$ will be between limits which are less than those mentioned above in the case of the use of enriched air or of oxygen as the oxidant.

The aforementioned conditions may be obtained by recycling some of the output gases of the exhaust turbine or of the partial-oxidation reactor, the fuel flow being premixed with steam. The latter is produced by indirect exchange with the combustible effluent of the power turbine, or comes from the steam mains of the industrial site.

An alternative mode of operation consists in bleeding off some of the fuel and in mixing it with the steam, or with some of it, so that the ratio $R_2$ is sufficiently high to eliminate the danger of carbon deposition. This involves a known primary reforming operation which is combined, according to the present invention, with a partial-oxidation gas-turbine cycle. The operating conditions of this reforming reactor are such that its effluent contains the necessary quantities of steam and hydrogen. The heat supplied to this endothermic reactor will come from chemical regeneration within the cycle itself, or from an external supply on the industrial site.

Laboratory tests have indicated that the quality of the reaction gases is considerably improved by adding hydrogen to the reaction gases, improving the $H_2$/CO ratio on the output side of the reactor, which ratio is thus between 1 and 2 and may approximate the theoretical value of 2.

These same tests have also demonstrated that adding hydrogen allows stricter control of the temperatures within the catalytic masses by significantly reducing the variations therein, these being much greater in tests performed without hydrogen.

The second complementary object of the basic invention results from the experimentation. It has been possible to achieve an optimum profile, without too marked a hot spot, by using different layers of catalysts and, in some cases, using the same active material but in 10 different concentrations. Incorporation of this type of technological solution within a cycle comprising one or more gas turbines had not hitherto been envisaged, and this proves to be preferable, indeed almost essential, for lasting operation of the entire system.

The third complementary object of the basic invention is founded on analysis of the most modern technologies used for manufacturing gas-turbine blades.

The fourth complementary object of the basic invention derives from the computations for optimizing the gas-turbine cycle, this being considered separately or being incorporated into complex energy systems. This object was demonstrated by making use of known methods for analysing energy systems. The solution which resulted has not yet been applied in conjunction with the basic technology.

It is understood that the four additional objects may be applied to each of the three preferred exemplary modes of application described above.

It should be understood that the scope of the present application also extends to the energy systems of the type described above which are incorporated into a line for the preparation of synthesis gas for chemicals, such as methanol and ammonia. In this case, the aforementioned ratios would consequently be influenced thereby, especially depending on the chemicals desired.

It should be understood that the present invention is also of value for cycles comprising one or more gas turbines supplied with products coming from the gasification of coal, propane/butane (LPG) or other gases, such as those used in refineries.

Partial oxidation is also applicable when it takes place not only using air but also using oxygen-enriched air or using oxygen.

In FIGS. 17 to 20, the arrow denoted by the reference A indicates the air entering the system in the direction of flow denoted by the arrow F. The arrow denoted by the reference G indicates the entry of the gases into the combustion chamber 102, the reference H indicating the entry of these into the element 107 and 207. J represents the sum G+H, S represents the steam inlet and $H_2$ the hydrogen inlet, and K represents the effluents from the turbine 243.

What is claimed is:

1. A method of generating power energy, comprising the steps of:

(i) introducing a first combustible gas into a catalytic reactor;

(ii) submitting said first gas in said catalytic reactor to a partial oxidation reaction by an oxygen-containing gas in the presence of steam injected upstream of said catalytic reactor and of a predetermined quantity of hydrogen acting as an initiating agent, for producing a second combustible gas at a controlled high temperature; and (iii) using said second combustible gas from said catalytic reactor for driving a power turbine to generate power energy.

2. The method as claimed in claim 1, wherein the hydrogen is provided depending on a triplet of molar ratios at a catalytic reactor inlet defined by the expressions below:

$$R_1 = O_2/C; \quad R_2 = H_2O/C; \quad R_3 = H_2/C$$

in which each of said molar ratios has a predetermined value, which is between 0.55 and 0.75, between 0.8 and 1.4 and between 0.03 and 0.15, respectively.

3. The method as claimed in claim 2, wherein the molar ratio defined by the expression $H_2/CO$ at the outlet of said catalytic reactor is between 1.5 and 2 and preferably fairly close to 2.

4. The method as claimed in claim 2, wherein the hydrogen is obtained from the system itself with partial recycling of the gases collected downstream of said reactor, said gases being premixed with steam.

5. The method as claimed in claim 3, wherein the hydrogen is obtained from the system itself with partial recycling of the gases collected downstream of the said reactor, said gases being premixed with steam.

6. The method as claimed in claim 1, wherein said partial oxidation reaction is achieved using a multi-layer catalyst comprising at least a first non-active layer and a second active layer.

7. The method as claimed in claim 6, wherein use is made of an active layer comprised of sub-layers of different types.

8. The method as claimed in claim 6, wherein use is made of an active layer comprised of sub-layers having different activities and/or different concentrations.

9. The method as claimed in claim 6, wherein use is made of an active layer that is arranged on a support comprised of refractory metals.

10. The method as claimed in claim 1, wherein said oxygen-containing gas is preheated within a temperature range of between 400° C. and 500° C. approximately.

11. An apparatus intended to generate power energy, said apparatus comprising:

gas compressor means for accepting a gas containing oxygen for producing compressed gas;

a catalytic reactor adapted for being fed by a mixture of a first combustible gas, said compressed gas, steam injected upstream of said catalytic reactor, and a predetermined quantity of hydrogen as an initiating agent, for producing a second combustible gas at a controlled high temperature as a result of the partial oxidation reaction of said first combustible gas by said oxygen-containing gas; and a power turbine for being driven by said second combustible gas delivered by said catalytic reactor, said power turbine generating power energy.

12. An apparatus as claimed in claim 11, wherein the catalytic reactor includes a multi-layer catalytic mass comprised of at least a non-active layer and an active layer.

13. An apparatus as claimed in claim 12, wherein said active layer is comprised of sub-layers having different types and/or having different activities and/or different concentrations.

14. An apparatus as claimed in claim 11, wherein said power turbine has blades coated with a catalytic coating.

15. The method as claimed in claim 6, wherein use is made of an active layer comprised of successive layers of different types and/or different activities.

16. The method as claimed in claim 6, wherein use is made of an active layer comprised of successive layers of the same active material in different concentrations.

17. The method as claimed in claim 6, wherein use is made of a non-active layer that is arranged on a support comprised of refractory metals.

18. An apparatus as claimed in claim 12, wherein said active layer is comprised of successive layers having different types and/or having different activities.

19. An apparatus as claimed in claim 12, wherein said active layer is comprised of successive layers comprised of same or similar active materials in different concentrations.

20. An apparatus as claimed in claim 12, wherein said non-active layer is arranged on a support comprised of refractory metals.

21. An apparatus as claimed in claim 12, wherein said active layer is arranged on a support comprised of refractory metals.

22. An apparatus as claimed in claim 11, further including an aeroderivative turbine adapted for including and operating said gas compressor means, said catalytic reactor, and said power turbine.

23. An apparatus as claimed in claim 11, further including an industrial gas turbine adapted for including and operating said gas compressor means, said catalytic reactor, and said power turbine.

24. An apparatus as claimed in claim 11, further including an isothermal gas turbine adapted for including and operating said gas compressor means, said catalytic reactor, and said power turbine.

* * * * *